United States Patent [19]

Miyagawa et al.

[11] Patent Number: 4,930,869
[45] Date of Patent: Jun. 5, 1990

[54] LIGHT BEAM SCANNING DEVICE

[75] Inventors: Ichiro Miyagawa; Noboru Arai, both of Kanagawa, Japan

[73] Assignee: Fuji Photo Film Co., Ltd., Kanagawa, Japan

[21] Appl. No.: 230,106

[22] Filed: Aug. 8, 1988

[30] Foreign Application Priority Data

Aug. 7, 1987 [JP] Japan ................. 62-198799

[51] Int. Cl.⁵ ............................................. G02B 26/10
[52] U.S. Cl. ..................... 350/6.8; 350/319; 350/276 R
[58] Field of Search .................. 350/6.1, 6.2, 6.3, 6.4, 350/6.5, 6.6, 6.7, 6.8, 6.9, 6.91, 486, 319, 276 R, 277, 283, 284

[56] References Cited

FOREIGN PATENT DOCUMENTS 0076939 6/1977 Japan ..................... 350/6.8
1087104 5/1986 Japan ................. 350/276 R
0264021 11/1987 Japan ..................... 350/6.7

Primary Examiner—Eugene R. LaRoche
Assistant Examiner—Ronald M. Kachmarik
Attorney, Agent, or Firm—Sughrue, Mion, Zinn, Macpeak & Seas

[57] ABSTRACT

A light beam scanning device for scanning an object to read image information therefrom or record image information thereon includes a reflecting-mirror light deflector for reflecting and deflecting a light beam in a plane, and a scanning lens for passing the light beam deflected by the light deflector toward the object. An optical element such as a glass plate has an entrance surface for allowing the light beam to pass therethrough to the light deflector, and directs the light beam from the light deflector therethrough to the scanning lens. The entrance surface is inclined at a predetermined angle to a direction normal to an optical axis of the scanning lens.

11 Claims, 6 Drawing Sheets

LIGHT BEAM SCANNING DEVICE

BACKGROUND OF THE INVENTION

The present invention relates to a light beam scanning device, and more particularly to a light beam scanning device for applying a light beam reflected and deflected by a reflecting-mirror light deflector to an object to be scanned, through an optical element having an entrance surface inclined at a prescribed angle to the direction in which the light beam falls on the optical element, for reading or recording an image or the like with high accuracy.

There is known an image scanning reading/reproducing system for applying a light beam to scan a recording medium with image information recorded thereon to photoelectrically read the recorded image information for thereby producing an image signal, and modulating a light beam with the image signal and scanning another recording medium such as a photographic photosensitive medium or the like with the modulated light beam to form a visible image thereon.

In the known image scanning reading/reproducing system, each recording medium is scanned by the light beam deflected by a reflecting mirror light deflector which has reflecting facets that are rotatable or vibratable at high speed.

One known light beam scanning device employing such a reflecting-mirror light deflector is illustrated in FIG. 1 of the accompanying drawings. The illustrated light beam scanning device scans a stimulable phosphor sheet S carrying recorded image information with a laser beam L to photoelectrically read the recorded image information. When a certain phosphor is exposed to a radiation such as X-rays, α-rays, β-rays, γ-rays, cathode rays, or ultraviolet rays, for example, the phosphor stores a part of the energy of the radiation. When the phosphor exposed to the radiation is subsequently exposed to stimulating rays such as visible light, the phosphor emits light in proportion to the stored energy. The phosphor exhibiting such a property is referred to as a "stimulable phosphor", and the stimulable phosphor sheet S is a sheet having a layer of such stimulable phosphor.

In the light beam scanning device, a laser beam L emitted from a laser oscillating tube 2 is deflected in the direction of the arrow A by a a reflecting-mirror light deflector, i.e., a polygon mirror 4 to pass through a scanning lens 6. The laser beam L is then divided by a half-silvered mirror 8 into a scanning laser beam $L_1$ and a scanning laser beam $L_2$, which go in different directions that are about 90° spaced from each other.

The scanning laser beam $L_1$ reflected by the mirror 8 scans the stimulable phosphor sheet S in a main scanning direction (indicated by the arrow B) upon rotation of the polygon mirror 4. The stimulable phosphor sheet S is fed in an auxiliary scanning direction (indicated by the arrow C) by a sheet feed mechanism (not shown). Therefore, the scanning laser beam $L_1$ scans the entire surface of the stimulable phosphor sheet S two-dimensionally. In response to application of the scanning laser beam $L_1$, the stimulable phosphor sheet S emits light in an intensity proportional to the image information recorded thereon. The emitted light is then applied to a photomultiplier 12 through a light guide 10 with its light entrance end disposed over the stimulable phosphor sheet S along the main scanning line thereon. The light received by the photomultiplier 12 is converted thereby into an electric signal, which will be displayed on a display unit such as a CRT or recorded on a recording medium such as a magnetic tape.

The synchronizing laser beam $L_2$ that has passed through the mirror 8 falls on a reference grating plate 16 of a synchronizing signal generator 14, and is applied through a cylindrical light collecting rod 18 disposed behind the reference grating plate 16 to light sensors 20a, 20b mounted on the opposite ends, respectively, of the light collecting rod 18. The reference grating plate 16 has typically an array or linear pattern 22 of alternate slits and bars along the direction in which the synchronizing laser beam $L_2$ sweeps. Therefore, the synchronizing laser beam $L_2$ which positionally corresponds to the scanning laser beam $L_1$ is applied as a pulsed light signal to the light sensors 20a, 20b. As a result, the light sensors 20a, 20b produce a synchronizing signal from the applied pulsed light signal, which is employed to accurately read the image information from the stimulable phosphor sheet S.

The polygon mirror 4 used as the light deflector in the light beam scanning device has reflecting facts each having its reflectivity variable dependent on the angle at which the laser beam L is applied to the reflecting fact. Therefore, the energy intensity of the laser beam L reflected by the polygon mirror 4 varies with time, and the scanning laser beam $L_1$ which scans the stimulable phosphor sheet S in the main scanning direction of the arrow B is subject to so-called shading. As a result, it is impossible to obtain accurate image information from the stimulable phosphor sheet S. Likewise, the synchronizing laser beam $L_2$ that has passed through the mirror 8 to the reference grating plate 16 also suffers shading, thus failing to produce an accurate synchronizing signal.

SUMMARY OF THE INVENTION

It is a principal object of the present invention to provide a light beam scanning device for applying a light beam reflected and deflected by a reflecting-mirror light deflector to an object to be scanned, through an optical element which is inclined at a prescribed angle to the direction in which the light beam falls on the optical element, for correcting shading of the light beam to read or record an image or the like with high accuracy.

Another object of the present invention is to provide a light beam scanning device for scanning an object to read image information therefrom or record image information thereon, comprising a reflecting light deflector for deflecting a light beam in a plane; a scanning lens for passing the light beam deflected by the light deflector toward the object; and an optical element for directing the light beam from the light deflector therethrough toward the scanning lens, the optical element having an entrance surface for allowing the light beam to pass therethrough to the light deflector, the entrance surface being inclined at a predetermined angle to a direction normal to an optical axis of the scanning lens.

Still another object of the present invention is to provide a light beam scanning device wherein the optical element is disposed between the light deflector and the scanning lens.

Yet another object of the present invention is to provide a light beam scanning device wherein the optical element comprises a light-transmissive plate for passing therethrough the light beam toward the scanning lens.

Yet still another object of the present invention is to provide a light beam scanning device wherein the light-transmissive pate comprises a glass plate.

Still another object of the present invention is to provide a light beam scanning device wherein the entrance surface of the light-transmissive plate has an antireflection coating thereon.

A further object of the present invention is to provide a light beam scanning device further comprising a casing housing the light deflector and having an opening in which the optical element is mounted.

A still further object of the present invention is to provide a light beam scanning device wherein the optical element has a surface to which the light beam reflected and deflected by the light deflector is applied, the surface being inclined at a predetermined angle transverse to the plane.

A yet further object of the present invention is to provide a light beam scanning device wherein the optical element comprises a reflecting mirror for reflecting the light beam from the light deflector toward the scanning lens.

A yet still further object of the present invention is to provide a light beam scanning device wherein the light deflector comprises a polygon mirror.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
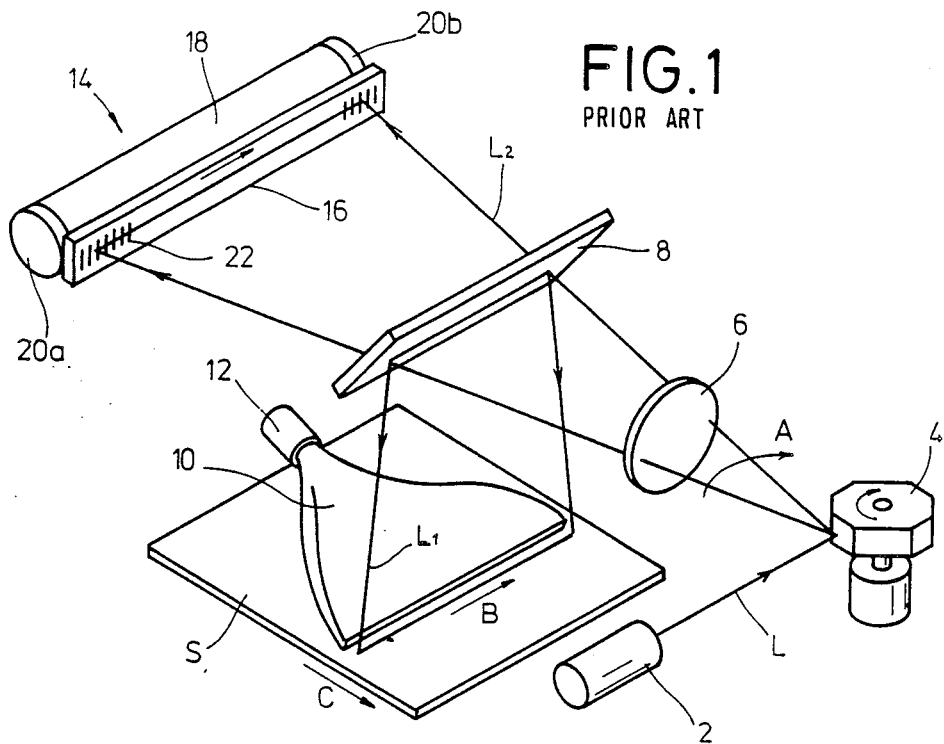
FIG. 1 is a schematic perspective view of a conventional light beam scanning device.
Figure 2:
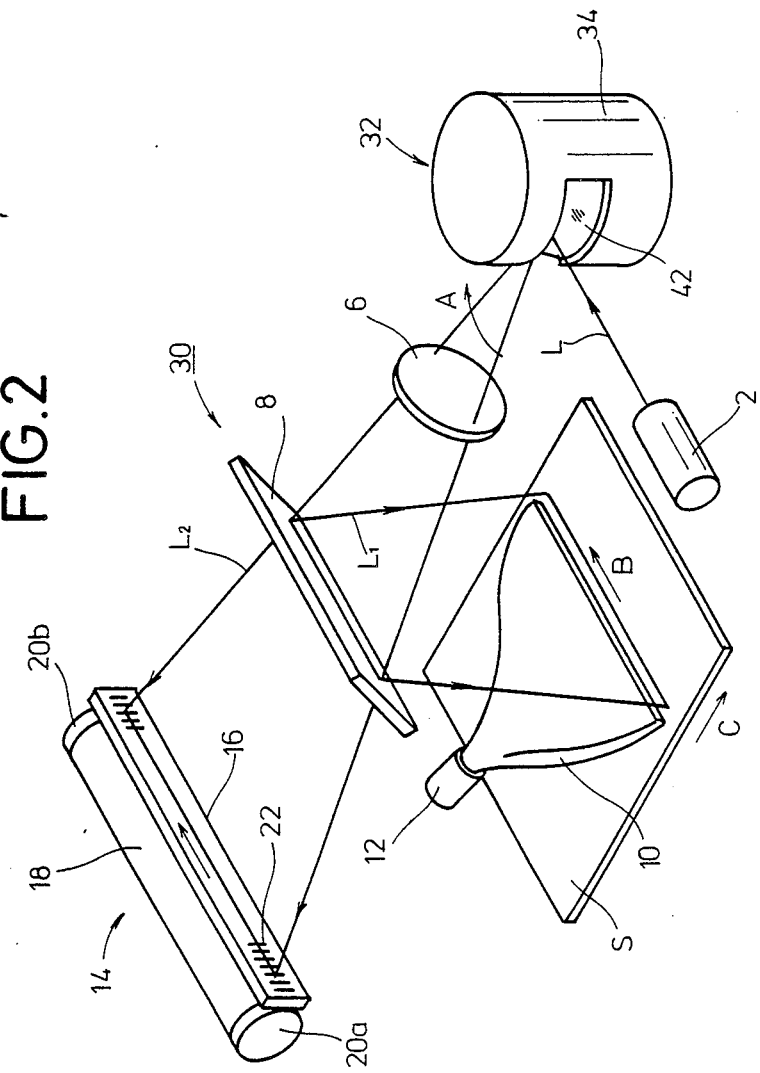
FIG. 2 is a schematic perspective view of a light beam scanning device according to the present invention.

FIG. 2 illustrates a light beam scanning device, generally designated by the reference numeral 30, according to the present invention. The light beam scanning device 30, except a light deflector thereof which will be described below, is substantially the same in construction as the light beam scanning device shown in FIG. 1. Therefore, those parts of the light beam scanning device 30 which are identical to those of the light beam scanning device shown in FIG. 1 are denoted by identical reference characters, and will not be described in detail.

Figure 3:
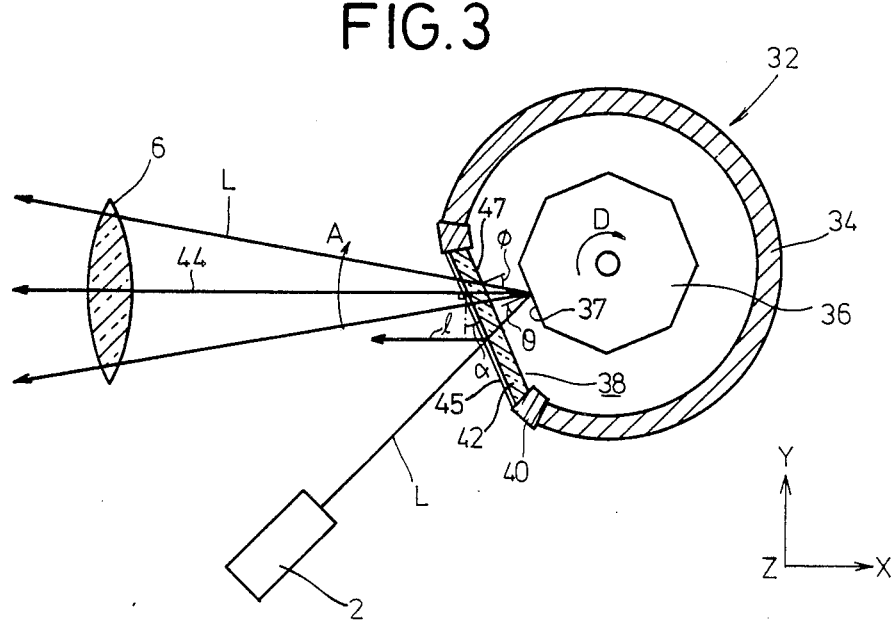
FIGS. 3 and 4 are horizontal and vertical cross-sectional views of a light deflector in the light beam scanning device of the present invention.
Figure 4:
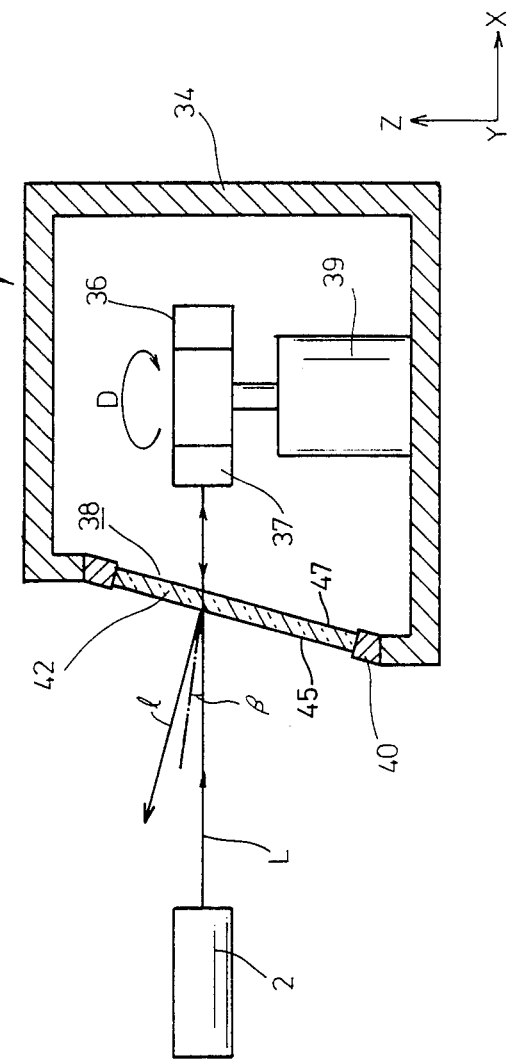

The light beam scanning device 30 includes a light deflector 32 comprising a casing 34 and a polygon mirror 36 housed in the casing 34 as shown in FIGS. 2 through 4. The polygon mirror 36 has a plurality of reflecting facets 37 for reflecting the laser beam L and is rotatable about its own axis at a high speed in the direction of the arrow D by a motor 39. The casing 34 has an opening 38 through which the laser beam L emitted from the laser oscillating tube 2 passes. A transparent optical element 42 in the form of a glass plate is mounted in the opening 38 by a mount 40.

The glass plate 42 is oriented such that its outer entrance surface 45 is inclined at an angle $\alpha$ ($\neq 0°$) to a direction normal to the optical axis 44 of the scanning lens 6 in an X-Y plane, and that the laser beam L falls on the surface 45 at an incident angle $\beta$ ($\neq 0°$) in an X-Z plane. Preferably, the glass plate 42 is coated on its inner and outer surfaces with antireflection layers.

The light beam scanning device 30 of the present invention is basically constructed as described above. Operation and advantages of the light beam scanning device 30 will be described below.

The laser beam L emitted from the laser oscillating tube 2 is directed to the light deflector 32 and applied through the glass plate 42 in the opening 38 to the reflecting facets 37 of the polygon mirror 36 which is being rotated at high speed in the direction of the arrow E. The laser beam L is reflected by the reflecting facets 37, and is applied to the scanning lens 6 through the glass plate 42. The scanning lens 6 converts the laser beam L into a constant-speed linear scanning laser beam L. The laser beam L is then divided into a synchronizing laser beam $L_2$ and the scanning laser beam $L_1$ by the half-silvered mirror 8. The synchronizing laser beam $L_2$ then reaches the reference grating plate 15, and passes through the slit-bar pattern 22 on the reference grating plate 16. The synchronizing laser beam $L_2$ travels in the light collecting rod 18, while being repeatedly reflected by the inner reflecting surface of the rod 18, toward the light sensors 20a, 20b as a pulsed light signal. The light sensors 20a, 20b photoelectrically convert the applied light signal into an electric signal from which a desired synchronizing signal will be generated.

The scanning laser beam $L_1$ reflected by the mirror 8 is applied to the stimulable phosphor sheet S. In response to the application of the scanning laser beam $L_1$, the stimulable phosphor sheet S emits light which is guided by the light guide 10 to the photomultiplier 12. The photomultiplier 12 converts the light into an electric signal based on the synchronizing signal produced by the synchronizing signal generator 14. The electric signal will be displayed as a visible image on a display unit such as a CRT, or recorded on a recording medium such as a magnetic tape, a photographic photosensitive material, or the like.

Figure 5:
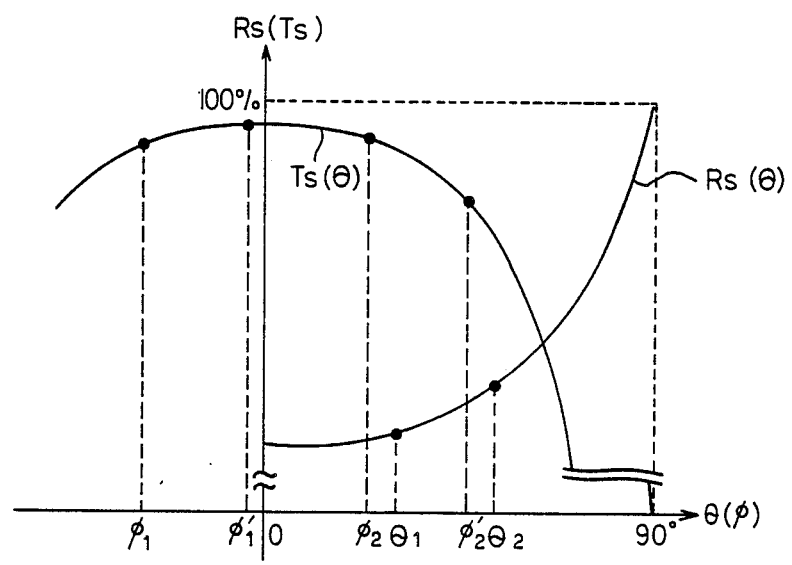
FIG. 5 is a graph showing the relationship between the reflectivity and transmittance and incident angles in the light beam scanning device of the present invention.

Assuming that the laser beam L is applied to the reflecting facets 37 of the polygon mirror 36 at an incident angle $\theta$, the reflectivity Rs of an S-polarized component of the laser beam L reflected by the reflecting facets 37 varies dependent on the incident angle $\theta$ as shown in FIG. 5. Since the polygon mirror 36 is rotated in the direction of the arrow D, the incident angle $\theta$ of the laser beam L on the reflecting facets 37 varies with time, and hence the energy intensity of the laser beam L reflected by the reflecting facets 37 varies in the direction of polarization. Also assuming that the laser beam L reflected by the reflecting facets 37 of the polygon mirror 36 is applied to the inner surface 47 of the glass plate 42 at an incident angle $\phi$, the transmittance Ts of the S-polarized component of the laser beam L varies dependent on the incident angle $\phi$ as illustrated in FIG. 5.

Figure 6:
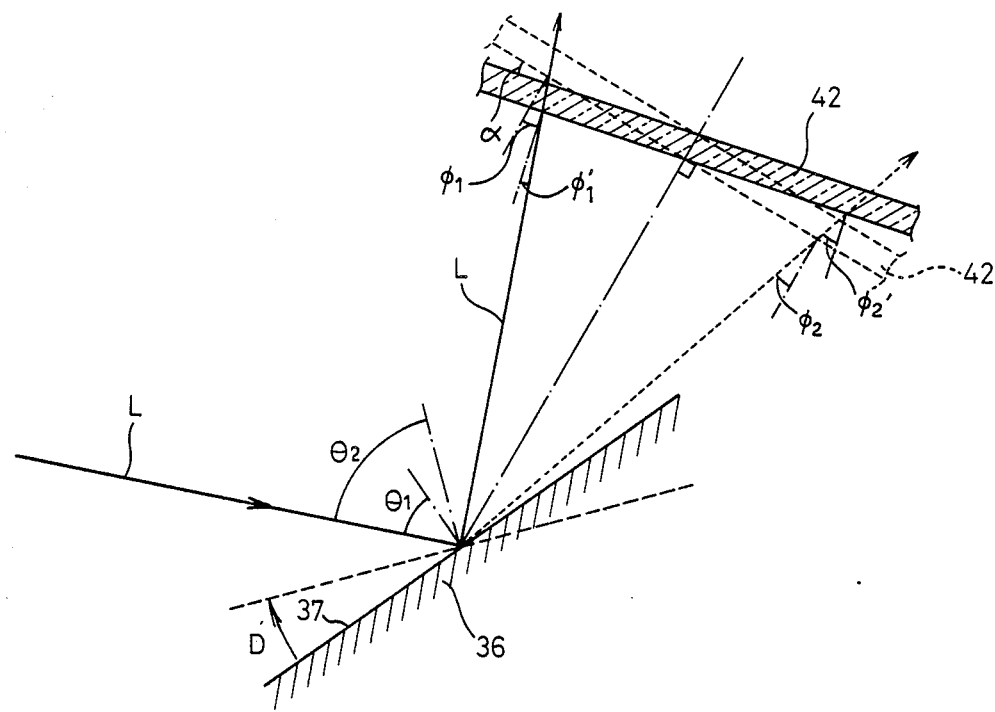
FIG. 6 is a schematic view illustrating the positional relationship between the light deflector and an optical element in the light beam scanning device.

It is assumed here that, as shown in FIG. 6, the incident angle $\theta$ of the laser beam L on the reflecting facet 37 of the polygon mirror 36 varies in the range from $\theta_1$ to $\theta_2$ ($\theta_1 < \theta_2$). If the angle $\alpha$ of inclination of the glass plate 42 to a plane normal to the optical axis of the scanning lens is 0, the incident angle $\phi$ of the laser beam L on the glass plate 42 varies in the range of $\phi_1 < \phi < \phi_2$ where $$\phi_1 \theta \phi_1 - \phi_2$$

$$\phi_2 \theta \phi_2 - \phi_1$$

and the transmittance Ts by the glass plate 42 varies in the range from Ts($\phi_1$) to Ts($\phi_2$). As the incident angle $\theta$ increases, the reflectivity Rs by the reflecting facets 37 of the polygon mirror 36 also increases, whereas the transmittance Ts remains substantially constant in the range of $\phi_1 < \phi < \phi_2$. Consequently, insofar as the angle $\alpha$ of inclination of the glass plate 42 is 0, the energy intensity of the laser beam L varies dependent on the scanning position thereof, i.e., the position where the laser beam L is scanned.

If the angle of inclination of the glass plate 42 is selected to be a certain angle ($\neq 0$), then the incident angle $\phi$ of the laser beam L applied to the glass plate 42 varies in the range of $\phi_1' < \phi < \phi_2'$ where $$\phi_1' = \theta_1 - \theta_2 + \alpha$$

$$\phi_2' = \theta_1 - \theta_1 + \alpha$$

The transmittance Ts by the glass plate 42 then varies in a range which is shifted to the right (FIG. 5) from the range in which it would vary if the angle $\alpha$ were 0. As the incident angle $\phi$ increases, the transmittance Ts decreases, whereas the reflectivity Rs by the reflecting facets 37 of the polygon mirror 36 increases as described above. Therefore, the change in the reflectivity Rs by the reflecting facets 37 can be compensated for by the change in the transmittance Ts by the glass plate 42. Thus, the energy intensity of the laser beam L which passes through the glass plate 42 and is applied to the scanning lens 6 remains substantially constant irrespective of the scanning position thereof.

While only the S-polarized component of the laser beam L has been described above, the reflectivity of the P-polarized component of the laser beam L by the reflecting facets 37 is substantially similar in characteristics to the reflectivity Rs of the S-polarized component, and likewise the transmittance of the P-polarized component by the glass plate 42 is substantially similar in characteristics to the transmittance Ts of the S-polarized component. Consequently, the P-polarized component can also be corrected in the same manner as described above.

As a result, the scanning laser beam $L_1$ which is applied to the stimulable phosphor sheet S through the scanning lens 6 and the mirror 8 scans the stimulable phosphor sheet S in the main scanning direction of the arrow B with a constant level of energy intensity. Therefore, it is possible for the stimulable phosphor sheet S to emit light bearing accurate image information. Similarly, the energy intensity of the synchronizing laser beam $L_2$ is also rendered substantially constant in the scanning direction thereof, the synchronizing signal generator 14 can generate a synchronizing signal highly accurately. Where the antireflection layers are coated on the surfaces 45, 47 of the glass plate 42, the transmittance of the laser beam L by the glass plate 42 is increased for thereby increasing the energy intensity levels of the scanning laser beam $L_1$ and the synchronizing laser beam $L_2$. Thus, the recorded image can be scanned with higher accuracy.

As illustrated in FIG. 4, the glass plate 42 is oriented such that the laser beam L emitted from the laser oscillating tube 2 is applied to the surface 45 of the glass plate 42 at the incident angle $\beta$ ($\neq 0°$) in the X-Z plane, as described above. Therefore, stray light 1 reflected from the surface 45 of the glass plate 42 which faces the laser oscillating tube 2 is prevented from reaching the stimulable phosphor sheet S or the reference grating plate 16 and hence from obstructing the reading of an accurate image signal. The antireflection coating on the surface 45 is effective in reducing the energy intensity of the stray light 1, so that any adverse effects which would be caused by irregular reflection of the stray light 1 in the device 30 can be reduced.

Since the polygon mirror 36 is enclosed in the casing 34, air in the device 30 is not caused to move or flow by the high-speed rotation of the polygon mirror 36. The laser beam L is therefore not disturbed by a change in the refractive index of the air which would be developed by air flows. The scanning laser beam $L_1$ thus scans the stimulable phosphor sheet S highly accurately in the main scanning direction to reproduce the image information to a nicety.

In the illustrated embodiment, intensity fluctuations of the laser beam L are compensated for by the varying transmittance thereof by the glass plate 42. However, the glass plate 42 may be replaced with a reflecting mirror for such intensity compensation. More specifically, the laser beam M reflected by the reflecting facets 37 of the polygon mirror 36 may be reflected toward the scanning lens 6 by a reflecting mirror inclined at a prescribed angle to the scanning direction of the laser beam L. The change in the reflectivity by the reflecting facets 37 of the polygon mirror 36 is offset by the change in the reflectivity by the reflecting mirror for minimizing intensity irregularities of the laser beam L.

With the present invention, as described above, the light beam reflected and deflected by the reflecting-mirror light deflector is directed to the object to be scanned, through the optical element that is inclined at a prescribed 2angle to the direction in which the light beam falls on the optical element, for reading or recording an image or the like. Inasmuch as the change in the reflectivity of the light beam by the light deflector is offset by the change in the transmittance or reflectivity of the light beam by optical element, the light beam with its shading corrected is led to the object. As a consequence, the image or the like can be read or recorded highly accurately by the light beam.

The principles of the present invention are also applicable to a device for recording an image or the like on an object to be scanned, such as a photographic photosensitive film.

Although a certain preferred embodiment has been shown and described, it should be understood that many changes and modifications may be made therein without departing from the scope of the appended claims.

What is claimed is:

1. A light beam scanning device for scanning an object to read image information therefrom or record image information thereon, comprising:
a reflecting light deflector for deflecting a light beam in a plane;

a scanning lens for passing the light beam deflected by said light deflector toward the object; and an optical element for directing the light beam from said light deflector therethrough toward said scanning lens, said optical element having an entrance surface for allowing the light beam to pass therethrough to said light deflector, said entrance surface being inclined at a first predetermined angle to a direction normal to an optical axis of said scanning lens, said first predetermined angle lying within said plane, whereby the changes in the optical element reflectance due to scanning of the beam are compensated by changes in the optical element transmittance.

2. A light beam scanning device according to claim 1, wherein said optical element is disposed between said light deflector and said scanning lens.

3. A light beam scanning device according to claim 1, wherein said optical element comprises a light-transmissive plate for passing therethrough the light beam toward the scanning lens.

4. A light beam scanning device according to claim 3, wherein said light-transmissive plate comprises a glass plate.

5. A light beam scanning device according to claim 3, wherein said entrance surface of the light-transmissive plate has an antireflection coating thereon.

6. A light beam scanning device according to any one of claims 1 through 3, further comprising a casing housing said light deflector and having an opening in which said optical element is mounted.

7. A light beam scanning device according to claim 1, wherein said optical element has a surface to which the light beam reflected and deflected by said light deflector is applied, said surface being inclined at a second predetermined angle transverse to said plane.

8. A light beam scanning device according to claim 1, wherein said optical element comprises a reflecting mirror for reflecting the light beam from said light deflector toward said scanning lens.

9. A light beam scanning device according to claim 1, wherein said light deflector comprises a polygon mirror.

10. A light beam scanning device for scanning an object to read image information therefrom or record image information thereon, comprising:

a source of light beam having a first optical axis;

a reflecting light deflector for generating a reflected light beam that is deflected in a plane;

a scanning lens for passing the reflected light beam deflected by said light deflector toward the object, said scanning lens having a second optical axis; and an optical element operative to pass therethrough the light beam from said light source to said light deflector and to pass the reflected light beam from said light deflector therethrough toward said scanning lens, said optical element having an entrance surface for allowing the light beam to pass therethrough to said light deflector, said entrance surface being inclined at a predetermined angle to a direction normal to said second optical axis of said scanning lens, whereby the changes in the optical element reflectance due to scanning of the beam are compensated by changes in the optical element transmittance.

11. The device of claim 1, wherein said light comprises a P-polarized and an S-polarized component and at least one of said components is passed through said scanning lens and said optical element.

* * * * *